(12) United States Patent
Inoue

(10) Patent No.: US 11,262,777 B2
(45) Date of Patent: Mar. 1, 2022

(54) POWER SUPPLY CIRCUIT, POWER SUPPLY DEVICE, AND MOTOR VEHICLE INCLUDING THE SAME

(71) Applicant: Rohm Co., Ltd., Kyoto (JP)

(72) Inventor: Hiroki Inoue, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 16/793,637

(22) Filed: Feb. 18, 2020

(65) Prior Publication Data

US 2020/0264644 A1    Aug. 20, 2020

(30) Foreign Application Priority Data

Feb. 19, 2019   (JP) .............................. JP2019-027519

(51) Int. Cl.
*G05F 1/575*   (2006.01)
*B60R 16/03*   (2006.01)
*H02M 3/156*   (2006.01)

(52) U.S. Cl.
CPC .............. *G05F 1/575* (2013.01); *B60R 16/03* (2013.01); *H02M 3/156* (2013.01)

(58) Field of Classification Search
None
See application file for complete search history.

(56) References Cited

U.S. PATENT DOCUMENTS 9,864,394 B2 * 1/2018 Katsushima ............ G05F 3/262
10,996,696 B2 * 5/2021 Inoue ................ H03K 19/00315

FOREIGN PATENT DOCUMENTS

JP    2016-143227    8/2016

* cited by examiner

*Primary Examiner* — Cassandra F Cox
(74) *Attorney, Agent, or Firm* — Fish & Richardson P.C.

(57) ABSTRACT

A power supply circuit, includes: an N-channel depletion type output transistor connected between an input terminal of an input voltage and an output terminal of an output voltage; and an operational amplifier configured to control a gate of the output transistor so that a feedback voltage corresponding to the output voltage matches a reference voltage.

4 Claims, 13 Drawing Sheets

POWER SUPPLY CIRCUIT, POWER SUPPLY DEVICE, AND MOTOR VEHICLE INCLUDING THE SAME

CROSS-REFERENCE TO RELATED APPLICATION

This application is based upon and claims the benefit of priority from Japanese Patent Application No. 2019-027519, filed on Feb. 19, 2019, the entire contents of which are incorporated herein by reference.

TECHNICAL FIELD

The present disclosure relates to a power supply circuit.

BACKGROUND

Power supply circuits that can generate a desired output voltage from an input voltage are mounted in various applications (vehicle-mounted equipment, industrial equipment, office equipment, digital home appliances, portable equipment, and the like).

For example, in an internal power supply circuit (constant voltage generation circuit) for generating an internal reference voltage or an internal power supply voltage of a power supply device, a P-channel enhancement type output transistor is generally used in order to generate an output potential equal to (or substantially equal to) an input potential. However, when the output transistor is of the P-channel type, a pole is generated on a low frequency side as compared with a case where an N-channel type output transistor is used. Therefore, a feedback loop is easily oscillated, a countermeasure (phase compensation) is required, and a frequency band generally becomes narrow. On the other hand, when an N-channel enhancement type output transistor is used, a high-level potential of a gate signal need to be made higher than an input potential, and a booster circuit such as a charge pump or the like is required.

SUMMARY

Some embodiments of the present disclosure provide a power supply circuit that operates stably at a low potential difference between an input and an output.

According to an embodiment of the present disclosure, there is provided a power supply circuit, which includes: an N-channel depletion type output transistor connected between an input terminal of an input voltage and an output terminal of an output voltage; and an operational amplifier configured to control a gate of the output transistor so that a feedback voltage corresponding to the output voltage matches a reference voltage (first configuration).

According to another embodiment of the present disclosure, there is provided a power supply circuit, which includes: an N-channel depletion type output transistor connected between an input terminal of an input voltage and an output terminal of an output voltage; a N-channel enhancement type first transistor including a drain connected to a gate of the output transistor, a source connected to a ground terminal, and a gate connected to a terminal to which a feedback voltage corresponding to the output voltage is applied; and an N-channel depletion type second transistor including a drain connected to the input terminal of the input voltage, and a source and a gate connected to the gate of the output transistor, wherein a bias voltage higher than a voltage at a source of the output transistor is applied to a back gate of the output transistor (second configuration).

The power supply circuit of the first configuration or the second configuration may further includes a switch configured to electrically connect or cut off the input terminal of the input voltage and the output transistor (third configuration).

According to another embodiment of the present disclosure, there is provided a power supply circuit, which includes: an N-channel depletion type output transistor connected between an input terminal of an input voltage and a terminal to which a switch voltage is applied; and a controller configured to control an on-duty of the output transistor so that an output voltage generated by rectifying and smoothing the switch voltage matches a target value (fourth configuration).

In the power supply circuit of any one of the first configuration to the fourth configuration, a negative voltage may be applied to the gate of the output transistor when the output transistor is turned off (fifth configuration).

In the power supply circuit of any one of the first configuration to the fifth configuration, a bias voltage higher than a voltage at a source of the output transistor may be applied to a back gate of the output transistor (sixth configuration).

According to another embodiment of the present disclosure, there is provided a power supply device, which includes the power supply circuit of any one of the first configuration to the sixth configuration, as an internal power supply circuit configured to generate an internal reference voltage or an internal power supply voltage (seventh configuration).

According to another embodiment of the present disclosure, there is provided a motor vehicle, which includes: the power supply device of the seventh configuration; and a load configured to receive power supply from the power supply device (eighth configuration).

DETAILED DESCRIPTION

Power Supply Circuit (Comparative Examples)

First, prior to describing novel embodiments of a power supply circuit, comparative examples to be compared with the embodiments will be briefly described.

Figure 1:
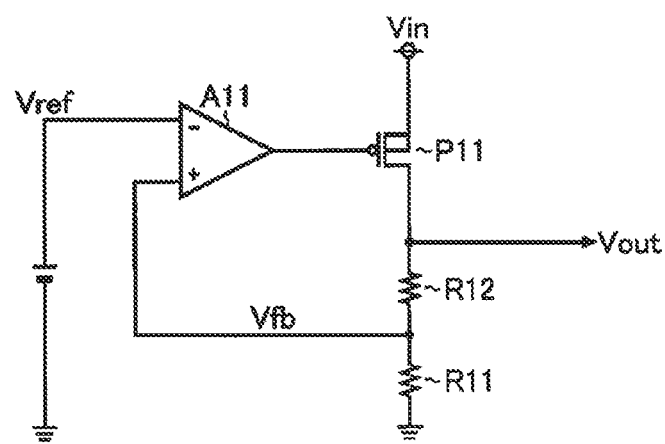
FIG. 1 is a diagram showing a first comparative example of a power supply circuit.

FIG. 1 is a diagram showing a first comparative example of a power supply circuit. The power supply circuit 10a of the first comparative example is a linear power supply that reduces an input voltage Vin to generate a desired output voltage Vout, and includes an output transistor P11 (=enhancement type PMOSFET), an operational amplifier A11, and resistors R11 and R12.

A source and a back gate of the output transistor P11 are connected to an input terminal of the input voltage Vin. A drain of the output transistor P11 and a first terminal of the resistor R12 are connected to an output terminal of the output voltage Vout. A second end of the resistor R12 is connected to a first terminal of the resistor R11. A second terminal of the resistor R11 is connected to a ground terminal. A non-inverting input terminal (+) of the operational amplifier A11 is connected to a connection node (=a terminal to which a feedback voltage Vfb is applied) between the resistors R11 and R12. An inverting input terminal (−) of the operational amplifier A11 is connected to a terminal to which a reference voltage Vref is applied. An output terminal of the operational amplifier A11 is connected to a gate of the output transistor P11. The resistors R11 and R12 may be omitted, and the output voltage Vout may be fed back, as it is, to the operational amplifier A11 as the feedback voltage Vfb.

The operational amplifier A11 described above controls the gate of the output transistor P11 such that the feedback voltage Vfb (=Vout×{R11/(R11+R12)}) corresponding to the output voltage Vout matches a predetermined reference voltage Vref. That is, an on-resistance value of the output transistor P11 is continuously controlled such that the output voltage Vout matches a target value (=Vref×{(R11+R12)/R11}) thereof.

When the P-channel enhancement type output transistor P11 is used, if the input voltage Vin is lower than a target value of the output voltage Vout, the output transistor P11 comes into a full ON state. Therefore, Vin ≒ Vout (i.e., LDO [low drop-out]) may be realized. However, a feedback loop may be easily oscillated because an output form is a source ground.

Figure 2:
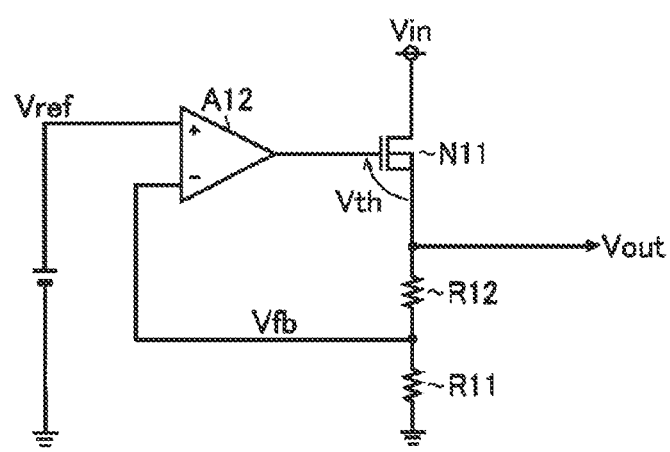
FIG. 2 is a diagram showing a second comparative example of a power supply circuit.

FIG. 2 is a diagram showing a second comparative example of the power supply circuit. In the power supply circuit 10b of the second comparative example, while being based on the above-described first comparative example (FIG. 1), an output transistor N11 (=enhancement type NMOSFET) is used instead of the output transistor P11 (=enhancement type PMOSFET). Further, along with the above change, an operational amplifier A12 whose input polarity is inverted is used instead of the operational amplifier A11.

Changes in the connection relationship will be described. A drain of the output transistor N11 is connected to an input terminal of the input voltage Vin. A source and a back gate of the output transistor N11 are connected to an output terminal of the output voltage Vout. A non-inverting input terminal (+) of the operational amplifier A12 is connected to a terminal to which the reference voltage Vref is applied. An inverting input terminal (−) of the operational amplifier A12 is connected to a connection node (=a terminal to which the feedback voltage Vfb is applied) between the resistors R11 and R12. An output terminal of the operational amplifier A12 is connected to a gate of the output transistor N11.

The operational amplifier A12 controls the gate of the output transistor N11 so that the feedback voltage Vfb corresponding to the output voltage Vout matches the reference voltage Vref. That is, an on-resistance value of the output transistor N11 is continuously controlled such that the output voltage Vout matches a target value thereof. In this respect, there is no difference from the first comparative example (FIG. 1).

When the N-channel enhancement type output transistor N11 is used, a feedback loop is not easily oscillated because the output form is a source follower (grounded drain). However, when the input voltage Vin is lower than the target value of the output voltage Vout, the output voltage Vout rises only up to Vin-Vth (where Vth is an on-threshold voltage of the output transistor N11). Therefore, Vin ≒ Vout (i.e., LDO) cannot be realized.

Figure 3:
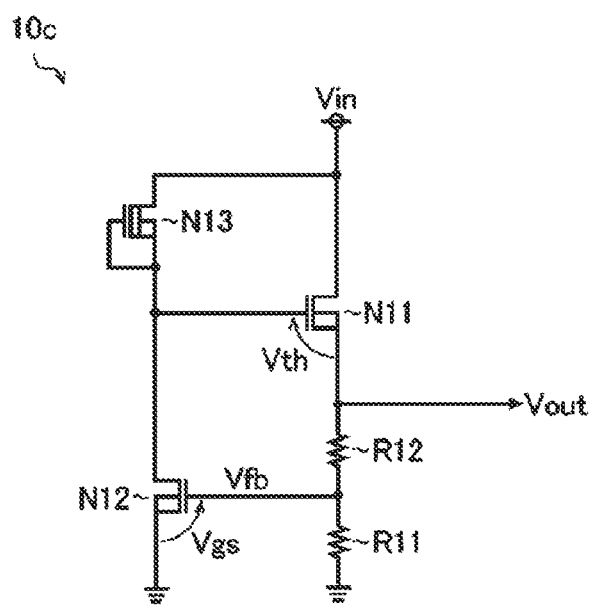
FIG. 3 is a diagram showing a third comparative example of a power supply circuit.

FIG. 3 is a diagram showing a third comparative example of the power supply circuit. In the power supply circuit 10c of the third comparative example, while being based on the above-described second comparative example (FIG. 2), a first transistor N12 (=enhancement type NMOSFET) and a second transistor N13 (=depletion type NMOSFET) are used instead of the operational amplifier A12.

Changes in the connection relationship will be described. A drain of the first transistor N12 is connected to a gate of the output transistor N11. A source and a back gate of the first transistor N12 are connected to a ground terminal. A gate of the first transistor N12 is connected to a connection node (a terminal to which the feedback voltage Vfb is applied) between the resistors R11 and R12. A drain of the second transistor N13 is connected to an input terminal of the input voltage Vin. A source, a gate, and a back gate of the second transistor N13 are connected to a gate of the output transistor N11.

The first transistor N12 and the second transistor N13 control the gate of the output transistor N11 such that the feedback voltage Vfb corresponding to the output voltage Vout matches a gate-source voltage Vgs of the transistor N12. That is, an on-resistance value of the output transistor N11 is continuously controlled such that the output voltage Vout matches a target value (=Vgs×{(R11+R12)/R11}) thereof.

In the power supply circuit 10c of the third comparative example, the N-channel enhancement type output transistor N11 is used as in the second comparative example (FIG. 2). Accordingly, a feedback loop is hardly oscillated. However, when the input voltage Vin is lower than the target value of the output voltage Vout, the output voltage Vout rises only up to Vin-Vth. Therefore, Vin ≒ Vout (i.e., LDO) cannot be realized.

Hereinafter, novel embodiments capable of solving the above-described problems will be proposed.

Power Supply Circuit (First Embodiment)

Figure 4:
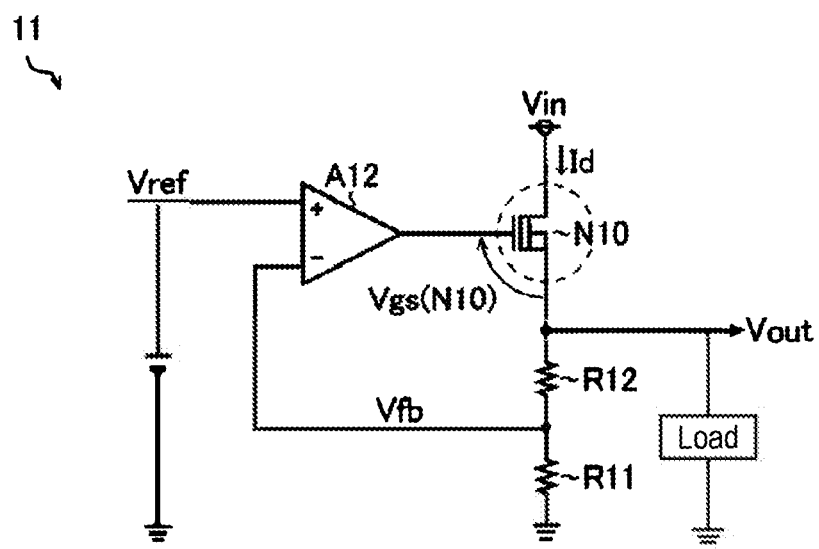
FIG. 4 is a diagram showing a first embodiment of a power supply circuit.

FIG. 4 is a diagram showing a first embodiment of the power supply circuit. In the power supply circuit 11 of the first embodiment, while being based on the above-described second comparative example (FIG. 2), an output transistor N10 (=depletion type NMOSFET) is used instead of the output transistor N11 (=enhancement type NMOSFET).

When the depletion type N-channel output transistor N10 is used in this manner, a drain current Id flows even when the gate-source voltage Vgs (N10) is 0V. Accordingly, even when the input voltage Vin is lower than the target value of the output voltage Vout, it is possible to realize Vin≒Vout (i.e., LDO).

Further, the power supply circuit 11 of the first embodiment is capable of outputting the output voltage Vout immediately after the input voltage Vin is applied (i.e., Vin=0 V). This will be described with reference to the drawings.

Figure 5:
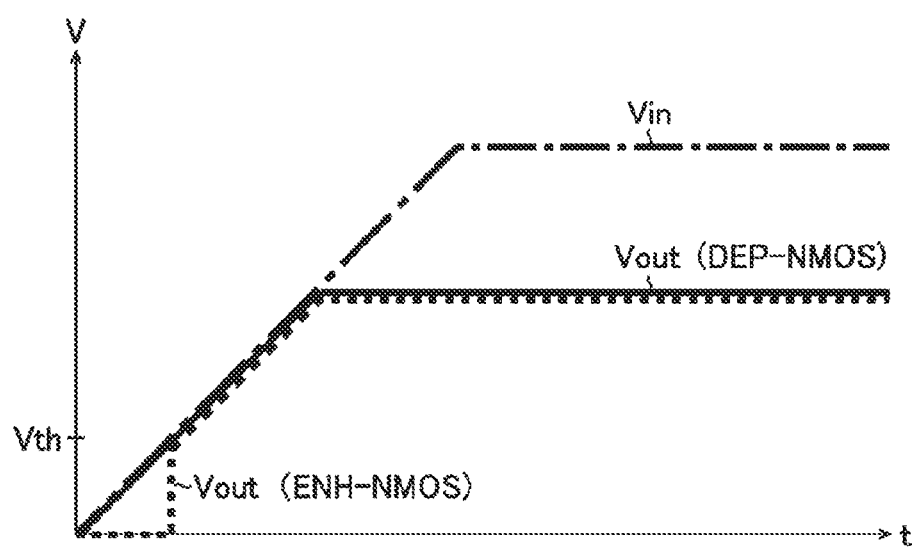
FIG. 5 is a diagram showing a relationship between an input voltage and an output voltage.

FIG. 5 is a diagram showing a relationship between the input voltage Vin and the output voltage Vout. The solid line indicates a behavior of the output voltage Vout in the first embodiment (=when the depletion type NMOSFET is used), and the broken line indicates a behavior of the output voltage Vout in the second comparative example (=when the enhancement type NMOSFET is used). In addition, the alternating long and short dash line indicates a behavior of the input voltage Vin.

As can be seen from the figure, in the power supply circuit 11 of the first embodiment, even when the input voltage Vin is lower than the on-threshold voltage Vth of the output transistor N11 (=enhancement type NMOSFET) immediately after the input voltage Vin is applied, it is possible to increase the output voltage Vout so as to follow the input voltage Vin.

Further, in the power supply circuit 11 of the first embodiment, the output form is a source follower (grounded drain). Therefore, the feedback loop is hardly oscillated as in the second comparative example (FIG. 2). This will be described with reference to the drawings.

Figure 6:
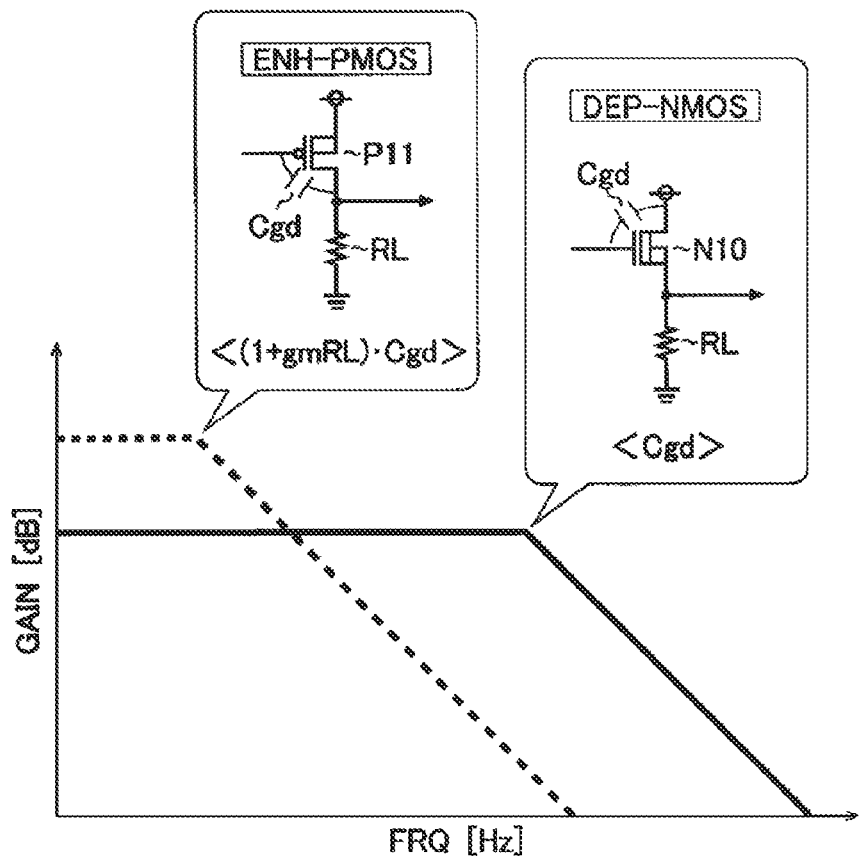
FIG. 6 is a diagram showing a relationship between a frequency and a gain.

FIG. 6 is a diagram showing a relationship between a frequency FRQ [Hz] and a gain GAIN [dB] in the feedback loop. The solid line indicates frequency-gain characteristics in the first embodiment (=when the depletion type NMOSFET is used), and the broken line indicates frequency-gain characteristics in the first comparative example (=when the enhancement type PMOSFET is used).

As can be seen from the figure, in the first comparative example (broken line) using the P-channel enhancement type output transistor P11, since the output form is a source ground, it appears that a feedback capacitance Cgd of the output transistor P11 is equivalently multiplied by (1+gmRL) due to the Miller effect (where RL is a load resistance, and gm is a trans-conductance of the output transistor P11). On the other hand, in the first embodiment (solid line) using the N-channel depletion type output transistor N10, since the output form is a source follower (grounded drain), the Miller effect does not work, and the feedback capacitance Cgd of the output transistor N10 is seen as it is.

As a result, in the first embodiment (solid line), the pole can be shifted to the higher frequency side by gmRL as compared with the first comparative example (broken line). Such a high-frequency pole (or pole reduction) makes it difficult for the feedback loop to oscillate. Therefore, it is possible to downsize or omit a phase compensation capacitor (e.g., an output capacitor connected between the output terminal of the output voltage Vout and the ground terminal). In addition, the gain reduction (gm) of the feedback loop may be complemented by the operational amplifier A12.

Power Supply Circuit (Second Embodiment)

Figure 7:
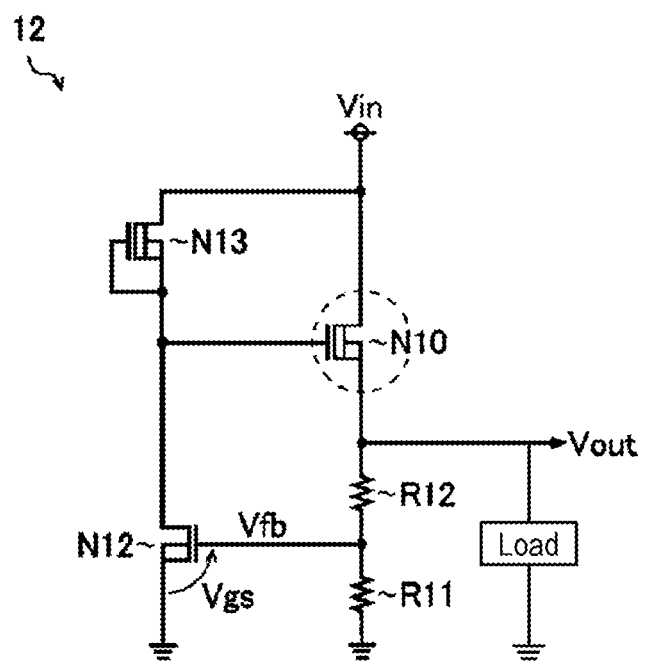
FIG. 7 is a diagram showing a second embodiment of a power supply circuit.

FIG. 7 is a diagram showing a second embodiment of the power supply circuit. In the power supply circuit 12 of the second embodiment, while being based on the above-described third comparative example (FIG. 3), the output transistor N11 (enhancement type NMOSFET) is replaced with an output transistor N10 (depletion type NMOSFET). With such a configuration, it becomes possible for the power supply circuit to operate stably with a low potential difference between an input and an output as in the first embodiment (FIG. 4).

Power Supply Circuit (Third Embodiment)

Figure 8:
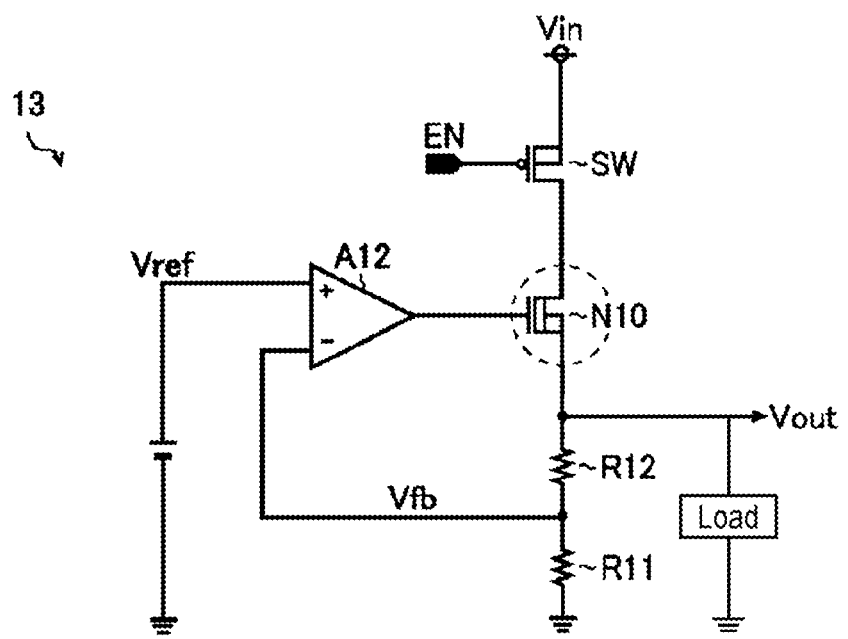
FIG. 8 is a diagram showing a third embodiment of a power supply circuit.

FIG. 8 is a diagram showing a third embodiment of the power supply circuit. The power supply circuit 13 of the third embodiment is based on the first embodiment (FIG. 4), and further includes a switch SW (enhancement type PMOSFET) that electrically connects or cuts off the input terminal of the input voltage Vin and the output transistor N10 in response to an enable signal EN. The switch SW is turned off when the enable signal EN is at a high level, and is turned on when the enable signal EN is at a low level. With this configuration, the output operation of the power supply circuit 13 can be arbitrarily turned on or off even when the output transistor N10 itself cannot be turned off. Therefore, for example, by setting EN=H at the time of overcurrent detection, it is possible to perform appropriate overcurrent protection.

Although not shown again, while being based on the above-described second embodiment (FIG. 7), a switch SW may be provided between the input terminal of the input voltage Vin and the output transistor N10.

Power Supply Circuit (Fourth Embodiment)

Figure 9:
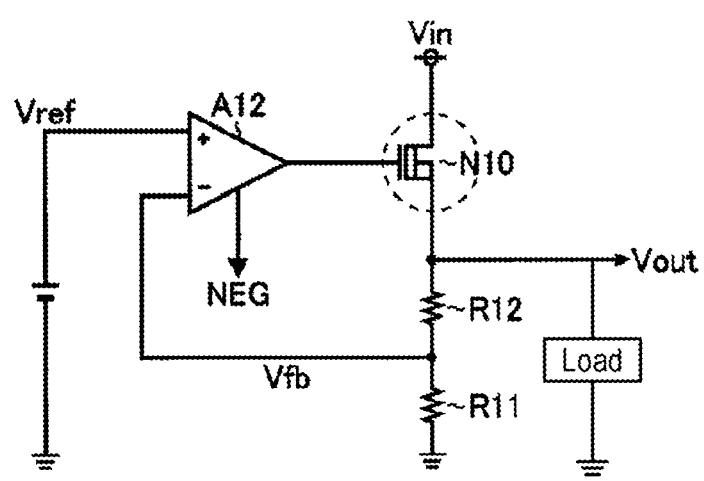
FIG. 9 is a diagram showing a fourth embodiment of a power supply circuit.

FIG. 9 is a diagram showing a fourth embodiment of the power supply circuit. In the power supply circuit 14 of the fourth embodiment, while being based on the above-described first embodiment (FIG. 4), a negative voltage NEG (<0 V) is supplied to the operational amplifier A12. The negative voltage NEG is applied to the gate of the output transistor N10 when the output transistor N10 is turned off. With such a configuration, the output transistor N10 can be arbitrarily turned off.

Although not shown again, while being based on the above-described third embodiment (FIG. 8), the negative voltage NEG may be applied when the output transistor N10 is turned off.

Power Supply Circuit (Fifth Embodiment)

Figure 10:
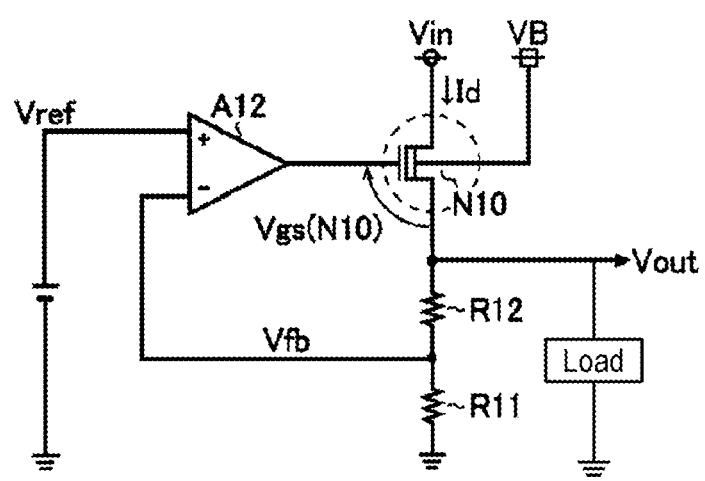
FIG. 10 is a diagram showing a fifth embodiment of a power supply circuit.

FIG. 10 is a diagram showing a fifth embodiment of the power supply circuit. In the power supply circuit 15 of the fifth embodiment, while being based on the above-described first embodiment (FIG. 4), a bias voltage VB higher than the source (=Vout) is applied to the back gate of the output transistor N10. With this configuration, the on-threshold voltage of the output transistor N10 can be shifted to the positive potential side by a substrate bias effect. Therefore, the output transistor N10 may be turned off (=the state where the drain current Id is zero or almost zero) without having to provide the negative voltage NEG.

Figure 11:
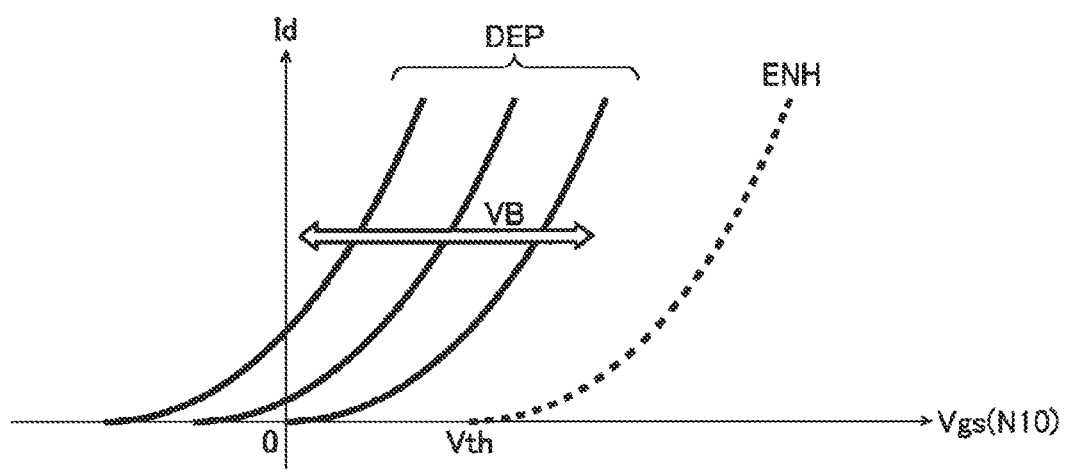
FIG. 11 is a diagram showing a relationship between a gate-source voltage and a drain current.

FIG. 11 is a diagram showing a relationship between the gate-source voltage Vgs (N10) of the output transistor N10 and the drain current Id. The solid line indicates characteristics of the output transistor N10 (=depletion type NMOSFET). On the other hand, the broken line indicates characteristics of the enhancement type NMOSFET. By changing the bias voltage VB applied to the back gate of the output transistor N10, the on-threshold voltage of the output transistor N10 can be arbitrarily adjusted as indicated by a white arrow in the figure.

Although not shown again, while being based on the above-described second embodiment (FIG. 7), the above-described third embodiment (FIG. 8), or the above-described fourth embodiment (FIG. 9), the bias voltage VB may be applied to the back gate of the output transistor N10.

Power Supply Circuit (Sixth Embodiment)

Figure 12:
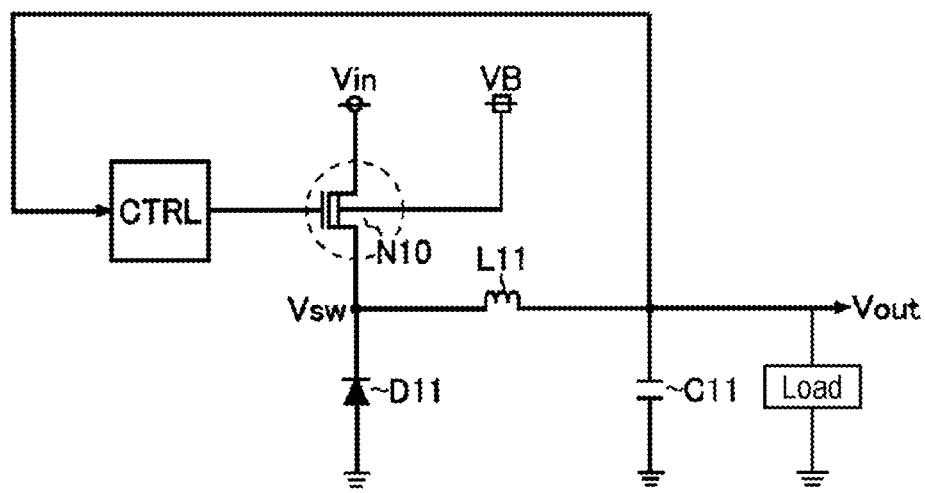
FIG. 12 is a diagram showing a sixth embodiment of the power supply circuit.

FIG. 12 is a diagram showing a sixth embodiment of the power supply circuit. In the power supply circuit 16 of the sixth embodiment, an example applied to a switching power supply (DC/DC converter) instead of the linear power supply described thus far is shown. More specifically, the power supply circuit 16 includes the output transistor N10 (=depletion type NMOSFET), a diode D11, an inductor L11, a capacitor C11, and a controller CTRL.

The drain of the output transistor N10 is connected to the input terminal of the input voltage Vin. The source of the output transistor N10 and the cathode of the diode D11 are connected to a first terminal (=a terminal to which a switch voltage Vsw is applied) of the inductor L11. The anode of the diode D11 is connected to a ground terminal. The gate of the output transistor N10 is connected to the controller CTRL. The back gate of the output transistor N10 is connected to a terminal to which the bias voltage VB is applied. The second terminal of the inductor L11 and the first terminal of the capacitor C11 are connected to an output terminal of the output voltage Vout. The second terminal of the capacitor C11 is connected to the ground terminal.

The diode D11, the inductor L11, and the capacitor C11 correspond to a rectifying/smoothing circuit that rectifies and smoothes the rectangular-wave switch voltage Vsw to generate an output voltage Vout. Further, a synchronous rectification transistor may be used instead of the diode D11.

The controller CTRL controls the on-duty of the output transistor N10 (=Ton/T, where T is the switching cycle and Ton is the on-time of the output transistor N10) such that the output voltage Vout matches the target value. It should be noted that a well-known technique such as a PWM (pulse width modulation) method or a PFM (pulse frequency modulation) method may be applied to the output feedback method of the controller CTRL, and thus a detailed description thereof will be omitted.

When the N-channel depletion type output transistor N10 is used in the switching power supply as described above, the on-duty can be increased to 100%. Therefore, it is possible to realize Vin≒Vout.

However, when applying to the switching power supply, in order to ensure that the output transistor N10 is turned off, it is necessary to apply a bias voltage VB to the back gate of the output transistor N10, or to apply a negative voltage NEG to the gate of the output transistor N10.

<Power Supply Device>

Figure 13:
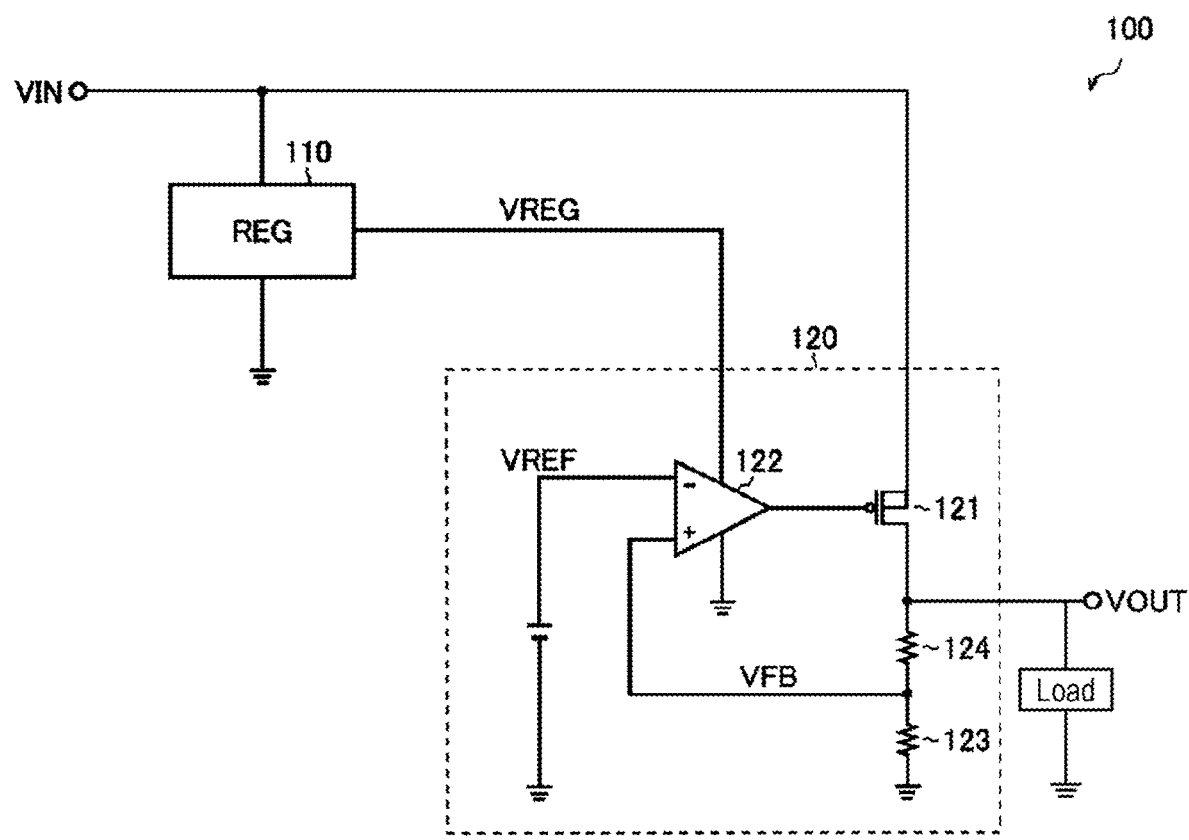
FIG. 13 is a diagram showing a configuration example of a power supply device.

FIG. 13 is a diagram showing a configuration example of a power supply device. The power supply device 100 of this configuration example is a high-withstand-voltage LDO regulator that generates a desired output voltage VOUT (e.g., 3.3 V or 5 V) by reducing an input voltage VIN (e.g., 3 to 45 V), and includes a first power supply circuit 110 and a second power supply circuit 120.

The first power supply circuit 110 is an internal power supply circuit that generates an internal power supply voltage VREG (e.g., 4 to 5 V) by reducing the input voltage VIN. As the first power supply circuit 110, the power supply circuits 11 to 16 described above may be suitably used. In this case, it may be understood that VIN=Vin and VREG=Vout.

The second power supply circuit 120 is a linear power supply that generates an output voltage VOUT by reducing the input voltage VIN. The second power supply circuit 120 includes an output transistor 121 (=enhancement type PMOSFET), an operational amplifier 122, and resistors 123 and 124 (having resistance values R1 and R2).

A source and a back gate of the output transistor 121 are connected to an input terminal of the input voltage VIN. A drain of the output transistor 121 and a first terminal of the resistor 124 are connected to an output terminal of the output voltage VOUT. A second terminal of the resistor 124 is connected to a first terminal of the resistor 123. A second terminal of the resistor 123 is connected to a ground terminal. A non-inverting input terminal (+) of the operational amplifier 122 is connected to a connection node (=a terminal to which a feedback voltage VFB is applied) between the resistors 123 and 124. An inverting input terminal (−) of the operational amplifier 122 is connected to a terminal to which a reference voltage VREF (e.g., 1 V) is applied. An output terminal of the operational amplifier 122 is connected to a gate of the output transistor 121. The resistors 123 and 124 may be omitted, and the output voltage VOUT may be fed back, as it is, to the operational amplifier 122 as the feedback voltage VFB.

The operational amplifier 122 described above controls the gate of the output transistor 121 so that the feedback voltage VFB (=VOUT×{R1/(R1+R2)}) corresponding to the output voltage VOUT matches a predetermined reference voltage VREF. That is, the on-resistance value of the output transistor 121 is continuously controlled so that the output voltage VOUT matches a target value (=VREF×{(R1+R2)/R1}) thereof.

In this configuration, the control system circuit such as the operational amplifier 122, instead of being supplied with the input voltage VIN, is supplied with an internal power supply voltage VREG obtained by reducing the input voltage VIN. With such a configuration, the control system circuit can be formed by an element having a withstand voltage lower than that of the output transistor 121 to which the input voltage VIN is applied. Therefore, it is possible to reduce the circuit area thereof.

The power supply circuits 11 to 16 described above may also be applied as means for generating the reference voltage VREF (=internal reference voltage) from the input voltage VIN (or the internal power supply voltage VREG). In this case, it may be understood that that VIN (or VREG)=Vin and VREF=Vout.

Although not shown again, a switching power supply may be used as the second power supply circuit 120 instead of the linear power supply.

<Application to Motor Vehicle>

Figure 14:
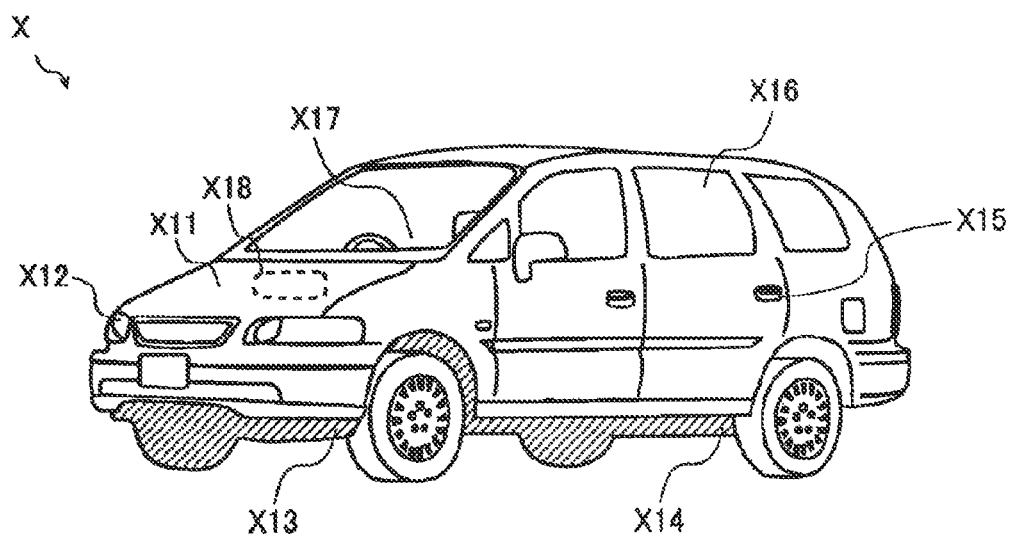
FIG. 14 is a diagram showing an appearance of a motor vehicle.

FIG. 14 is a diagram showing an appearance of a motor vehicle. The motor vehicle X of this configuration example includes various electronic devices X11 to X18 which are operated by receiving power supply from a battery (not shown). The mounting positions of the electronic devices X11 to X18 in the figure may be different from actual mounting positions for the sake of convenience of illustration.

The electronic device X11 is an engine control unit that performs control related to an engine (injection control, electronic throttle control, idling control, oxygen sensor heater control, auto cruise control, and the like).

The electronic device X12 is a lamp control unit that performs on/off control of a high-intensity discharge lamp (HID), a daytime running lamp (DRL), and the like.

The electronic device X13 is a transmission control unit that performs control related to a transmission.

The electronic device X14 is a brake unit that performs control related to the motion of the motor vehicle X (ABS [anti-lock brake system] control, EPS [electric power steering] control, electronic suspension control, and the like).

The electronic device X15 is a security control unit that performs drive control of a door lock, a security alarm, and the like.

The electronic device X16 is an electronic device incorporated in the motor vehicle X at a factory shipment stage as a standard equipment or a maker option article such as a wiper, an electric door mirror, a power window, a damper (shock absorber), an electric sunroof, an electric seat, or the like.

The electronic device X17 is an electronic device arbitrarily mounted on the motor vehicle X as a user option article such as an in-vehicle A/V [audio/visual] device, a car navigation system, an ETC [electronic toll collection system], or the like.

The electronic device X18 is an electronic device including a high-withstand-voltage motor, such as a vehicle-mounted blower, an oil pump, a water pump, a battery cooling fan, or the like.

The power supply device 100 described above can be incorporated in any of the electronic devices X11 to X18.

<Other Modifications>

The various technical features disclosed in the present disclosure may be modified in various ways without departing from the spirit of technical creation in addition to the above-described embodiments. For example, mutual replacement between a bipolar transistor and an MOS field effect transistor and inversion of logic levels of various signals are optional. That is, it is to be considered that the above-described embodiments are illustrative in all respects and not restrictive. The technical scope of the present disclosure is not limited to the above-described embodiments. It is to be understood that all changes belonging to the meaning and scope equivalent to the claims are included in the technical scope of the present disclosure.

The embodiments disclosed in the present disclosure can be used for a power supply circuit mounted in various applications (in-vehicle devices, industrial devices, office devices, digital home appliances, portable devices, and the like).

According to the present disclosure in some embodiments, it is possible to provide a power supply circuit that operates stably at a low potential difference between an input and an output.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A power supply circuit, comprising:
    an N-channel depletion type output transistor connected between an input terminal of an input voltage and an output terminal of an output voltage;
    a N-channel enhancement type first transistor including a drain connected to a gate of the output transistor, a source connected to a ground terminal, and a gate connected to a terminal to which a feedback voltage corresponding to the output voltage is applied; and
    an N-channel depletion type second transistor including a drain connected to the input terminal of the input voltage, and a source and a gate connected to the gate of the output transistor,
    wherein a bias voltage higher than a voltage at a source of the output transistor is applied to a back gate of the output transistor.

2. The power supply circuit of claim 1, further comprising:
    a switch configured to electrically connect or cut off the input terminal of the input voltage and the output transistor.

3. A power supply device, comprising:
    the power supply circuit of claim 1, as an internal power supply circuit configured to generate an internal reference voltage or an internal power supply voltage.

4. A motor vehicle, comprising:
    the power supply device of claim 3; and
    a load configured to receive power supply from the power supply device.

* * * * *